United States Patent [19]

Killian

[11] Patent Number: 4,887,634
[45] Date of Patent: Dec. 19, 1989

[54] APPARATUS FOR COUPLING A VALVE AND ROTARY ACTUATOR

[75] Inventor: Henry R. Killian, Monroe, N.C.

[73] Assignee: Conbraco Industries, Inc., Matthews, N.C.

[21] Appl. No.: 347,914

[22] Filed: May 5, 1989

[51] Int. Cl.[4] .................... F16K 43/00; F16K 31/124
[52] U.S. Cl. .................................... 137/315; 251/58; 251/214; 251/229; 251/292
[58] Field of Search ............... 137/315, 343; 248/674; 251/58, 229, 250, 304, 306, 308, 315, 291, 292, 214; 277/110, 111, 112

[56] References Cited

U.S. PATENT DOCUMENTS

| | | | |
|---|---|---|---|
| 3,107,080 | 10/1963 | Priese | 251/58 |
| 3,261,266 | 7/1966 | Ledeen et al. | 251/58 |
| 3,460,799 | 8/1969 | Sanctuary | 251/58 |
| 3,650,506 | 3/1972 | Bruton | 251/58 |
| 3,954,251 | 5/1976 | Callahan, Jr. et al. | 251/214 |
| 4,087,074 | 5/1978 | Massey et al. | 251/58 |
| 4,149,699 | 4/1979 | Speckman | 251/214 |
| 4,260,128 | 4/1981 | Tito | 251/58 |
| 4,270,849 | 6/1981 | Kalbfleisch | 251/292 |
| 4,313,595 | 2/1982 | Markley | 251/292 |
| 4,538,790 | 9/1985 | Williams | 251/214 |
| 4,633,897 | 1/1987 | Effenberger | 251/58 |
| 4,647,003 | 3/1987 | Hilpert et al. | 251/58 |
| 4,719,939 | 1/1988 | Killian | 137/315 |

Primary Examiner—George L. Walton
Attorney, Agent, or Firm—Shefte, Pinckney & Sawyer

[57] ABSTRACT

Apparatus for close positive coupling of an actuator to a ball valve utilizes a bracket plate assembly fixing the valve and actuator bodies together with the bracket plate in fitted engagement with the valve body annularly about its valve stem gland screw to apply reactive loads generated by valve actuation forces to the valve body rather than the valve stem, whereby essentially only torsional actuation forces are applied to the valve stem. The bracket plate assembly is affixed to the valve and actuator bodies, respectively, at opposite axial sides of the gland screw drive periphery for easy tightening access thereto without disassembly of the bracket assembly.

5 Claims, 2 Drawing Sheets

APPARATUS FOR COUPLING A VALVE AND ROTARY ACTUATOR

BACKGROUND OF THE INVENTION

Rotary actuators find widespread use in connection with fluid flow control valves of varying types for purposes of automating valve control or simplifying the control of inaccessible or remote valves. Since neither the rotary actuators nor the valves commonly employed in such circumstances are specifically designed for coupling with one another, a special bracketing system must be employed to join the valve and actuator bodies and couple the actuator output shaft with the valve stem or other valve actuating member. For the same reason, an inherent problem exists in obtaining and maintaining correct alignment between the actuator output member and the valve stem over the course of their coupled operation. As a result of this problem, conventional bracketing systems commonly provide a relatively extended separation between the valve and actuator for accommodating the misalignment thereof which may be expected to occur over the course of their coupled operation and thereby to minimize the effects of potentially destructive non-torsional reactive loads on the valve stem resulting from the valve actuation forces generated by the actuator. As will be recognized, such bracket arrangements do not solve the indicated problem but at best merely accommodate it. Further, the extended nature of such bracket arrangements significantly increases the space requirements for valve and actuator couplings.

One practical solution to these problems is disclosed in U.S. Pat. No. 4,719,939, by the same inventor as the present invention and commonly assigned herewith to Conbraco Industries, Inc., of Matthews, N.C., which provides an apparatus for coupling a valve and an actuator compactly in close positive alignment with one another while protecting the valve stem or like actuating member from reactive loads generated by valve actuation forces. Basically, this close coupling apparatus is adapted for use with a valve of the type having a valve body with a gland arrangement rotatably supporting a valve stem for actuating opening and closing movement of the valve and a rotary actuator of the type having an actuator body rotatably supporting an output shaft. A drive arrangement is provided for establishing coaxial drive connection of the valve stem and the actuator output shaft for controlling the opening and closing movement of the valve. A bracket arrangement substantially rigidly connects the valve body and the actuator body, the bracket arrangement having an opening which conforms to the gland arrangement for receiving the gland arrangement to apply reactive loads generated by valve actuation forces to the gland arrangement. In such manner, essentially only torsional actuation forces are applied to the valve stem. This valve-actuator coupling apparatus has been reasonably well received commercially. However, one potential drawback of the apparatus is that the gland arrangement of the valve is inaccessible once the valve and the actuator are coupled. Thus, if adjustment of the gland arrangement subsequently becomes necessary, the coupling apparatus must be disassembled.

SUMMARY OF THE INVENTION

It is accordingly an object of the present invention to provide an improved apparatus for coupling a valve and actuator in close positive alignment with one another which retains all of the advantages of the apparatus of U.S. Pat. No. 4,719,939, while also leaving exposed a drive portion of the gland arrangement of the valve for access thereto when tightening is periodically necessary without requiring disassembly of the apparatus.

Briefly summarized, the coupling apparatus of the present invention is adapted for use with a valve of the type having a valve body with a gland arrangement rotatably supporting a valve stem for actuating opening and closing of the valve, wherein the gland arrangement includes a drive portion disposed exteriorly of the valve body for actuating tightening movement of the gland arrangement with respect to the valve body, and a rotary actuator of the type having an actuator body rotatably supporting an output shaft. The present coupling apparatus includes a drive arrangement for establishing coaxial drive connection of the valve stem and the actuator output shaft for controlling the opening and closing movement of the valve. A bracket arrangement substantially rigidly connects the valve body and the actuator body. The bracket arrangement is designed for affixation to the valve body axially adjacent one side of the drive portion of the gland arrangement and includes an opening of a shape closely conforming to the valve body annularly with respect to the gland arrangement for receiving the valve body to apply reactive loads to the valve body generated by valve actuation forces of the rotary actuator, whereby essentially only torsional actuation forces are applied to the valve stem. Furthermore, the bracket arrangement is adapted for affixation to the actuator body for supporting it axially adjacent the opposite side of the drive portion of the gland arrangement. In this manner, the drive portion of the gland arrangement is left exposed by the bracket arrangement to allow access to the drive portion for periodic tightening without requiring disassembly of the bracket arrangement.

In the preferred embodiment, the valve body is provided with a shoulder extending annularly about the drive portion of the gland arrangement axially adjacent its one side for receipt within the opening of the bracket arrangement. The bracket arrangement includes a plate member having a flat main body for bolting to the valve body axially adjacent the aforesaid one side of the drive portion of the gland arrangement, with the opening of the bracket arrangement being formed in the flat main body. The plate member further includes a plurality of spacer members projecting from the flat main body for bolting to the actuator body to support it axially adjacent the opposite side of the drive portion of the gland arrangement. The drive portion of the gland arrangement preferably is in the form of an annular drive surface having notches in which a screw driver or similar tool may be engaged to drive tightening movement of the gland arrangement.

DESCRIPTION OF THE PREFERRED EMBODIMENT

Figure 1:
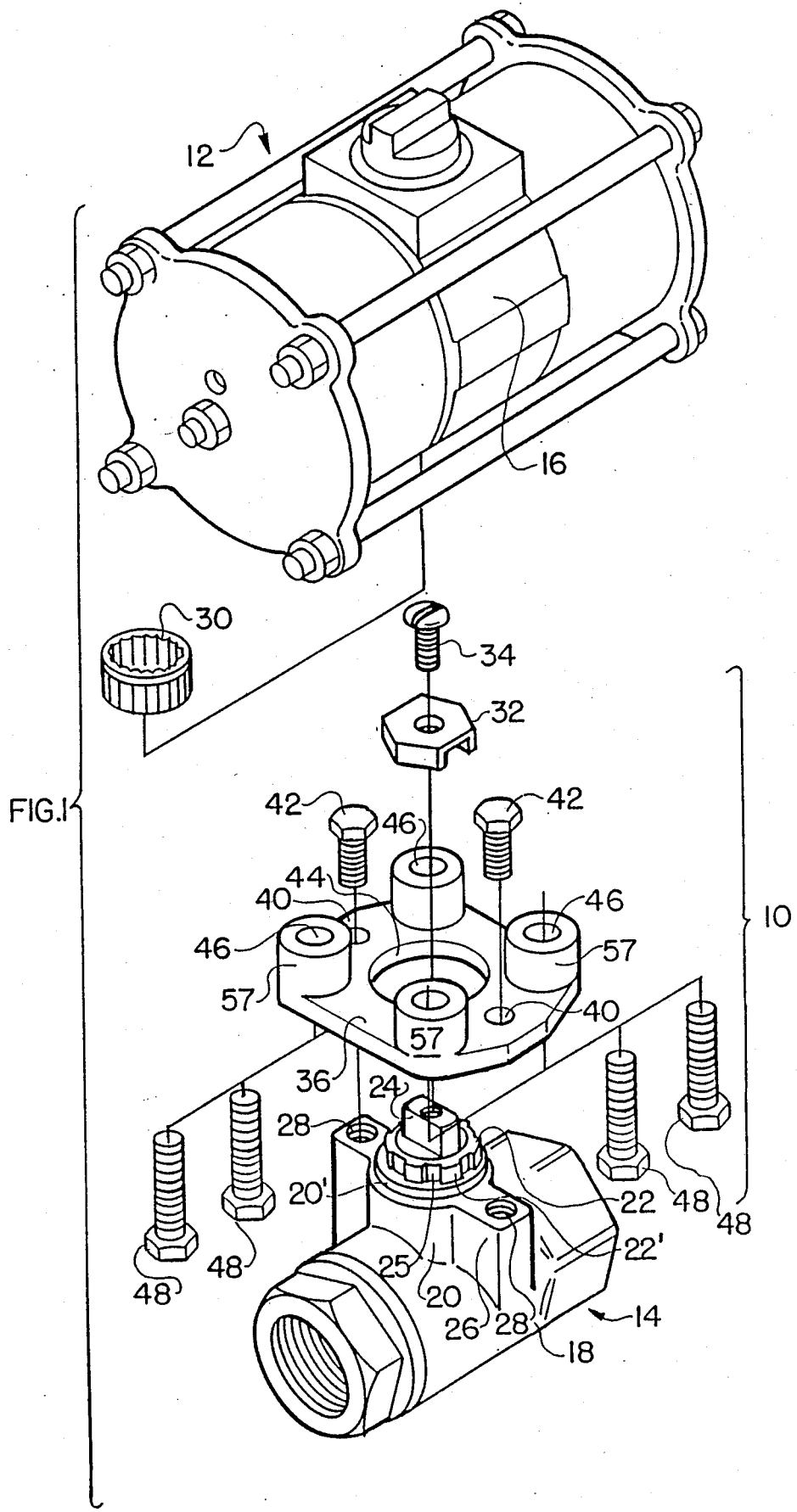
FIG. 1 is a side elevational view of a conventional rotary actuator and a conventional ball valve joined by a coupling apparatus according to the preferred embodiment of the present invention.
Figure 2:
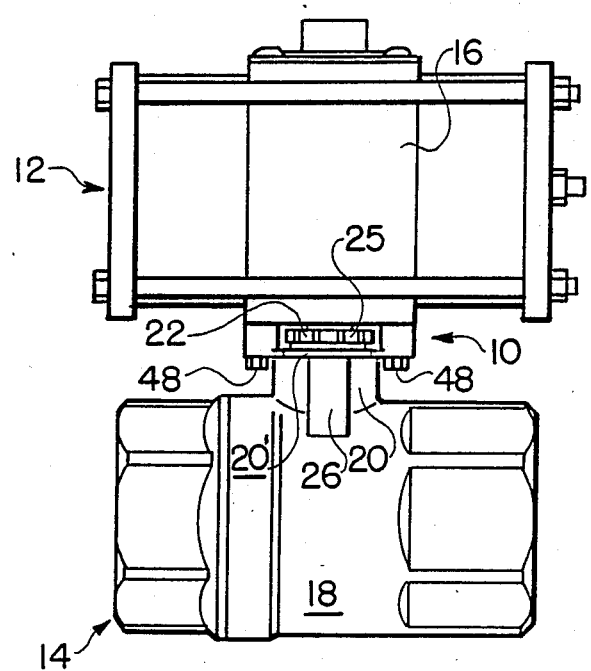
FIG. 2 is an end elevational view of the coupled ball valve and rotary actuator of FIG. 1.

Referring now to the accompanying drawings, the coupling apparatus of the present invention is shown generally at 10 in coupling relation with a conventional fluid-operated rotary actuator, indicated generally at 12, and a conventional rotary fluid control valve, indicated generally at 14.

The rotary actuator 12 a illustrated is exemplary of the CCA pneumatically-operated dual rack-and-pinion rotary one-quarter turn actuator manufactured and sold by Conbraco Industries, Inc., of Matthews, N.C., the assignee hereof. Since the construction and operation of such actuators is well known within the industry, a detailed description of the actuator 12 will not be set forth herein beyond that necessary to understand the present invention. As will be understood, the actuator 12 includes a main actuator body 16 within which a pinion gear (not shown) is rotatably disposed in respective meshing engagement with an opposed pair of slidable piston racks (also not shown). Pneumatic actuation of opposed movement of the piston racks toward and away from one another within the actuator body 16 synchronously produces reciprocal rotation of the pinion gear in opposite directions. At least one axial end of the pinion gear is exposed through the actuator body 16 and is provided with a female bore to facilitate driving connection of the pinion gear with a drive train or drive member to be reciprocably operated by the actuator 12.

The valve 14 is exemplary of a standard APOLLO brand two-piece body ball valve which is also manufactured and sold by Conbraco Industries, Inc. Hereagain, since the construction and operation of this ball valve is well known within the industry, a detailed description thereof is not set forth herein except insofar as necessary to facilitate an understanding of the present coupling apparatus. Basically, the valve 14 includes a tubular cast metal valve body 18 within which a valve ball (not shown) is rotatably contained between valve seat members for reciprocal valve opening and closing rotation to control fluid communication between the opposite tubular ends of the valve body 18. A tubular trunnion 20 projects outwardly from the central portion of the valve body 18 coaxial with the valve ball and threadedly receives a gland screw 22 which rotatably supports a valve stem 24 in operative connection with the valve ball for actuating its opening and closing rotation. The exterior surface of the valve body 18 at diametrically opposite sides of the trunnion 20 is formed with substantially flat mounting pads 26 each having a threaded bore 28 formed therein to facilitate mounting of the actuator 12.

According to the present invention, the drive portion 22' of the gland screw 22, which is exposed axially outwardly of the axial end of the trunnion 20 and which typically has an annular hexagonal drive surface, is modified to have a generally circular rather than hexagonal periphery and to have a plurality of notches 25 formed at essentially equal circumferential spacings in the periphery of the drive portion 22'. Additionally, the axial end face of the trunnion 20 of the valve body 18 is profiled as indicated at 20' to form an annular shoulder axially adjacent the exposed annular drive surface 22' of the valve gland screw 22.

Figure 3:
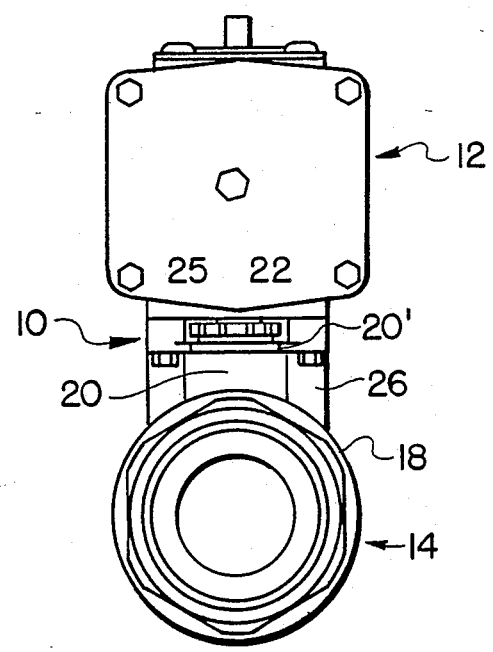
FIG. 3 is a perspective view illustrating the ball valve, rotary actuator and the present coupling apparatus in exploded relation.

The present coupling apparatus 10 will best be understood with reference to FIG. 3. Basically, the coupling apparatus 10 includes a drive arrangement for establishing a direct positive coaxial drive connection between the exposed output end of the actuator pinion gear and the valve stem 24 and a bracket arrangement for substantially rigidly connecting the valve body and the actuator body.

The drive arrangement includes an annular drive socket 30 adapted to be snugly press-fitted coaxially within the female bore in the axial output end of the actuator pinion. The interior of the drive socket 30 is annularly formed with a twelve-point double-hex broached surface configuration. A hexagonal valve stem adapter nut 32 having a slotted underside is provided to be fitted on the projecting exposed portion of the valve stem in conformity to the flattened sides thereof and a standard threaded retaining screw 34 is provided to be threadedly engaged coaxially to the valve stem 24 to retain the adapter nut 32 in place. The hexagonal configuration of the adapter nut 32 is sized to fit axially within the drive socket 30 to couple the drive socket 30 and adapter nut 32 in rotational driving engagement.

The bracket arrangement includes a bracket plate 36 with companion screws for rigid attachment respectively to the valve body 18 and the actuator body 12. The bracket plate 36 is generally rectangular in configuration and has a circular opening 44 formed centrally through the bracket plate 36 of a diameter closely corresponding to that of the shoulder 20' profiled in the end face of the trunnion 20 of the valve body to receive the profiled end of the trunnion 20 for fitted engagement annularly about the shoulder 20'. A pair of bores 40 are formed through the bracket plate 36 at diametrically opposite sides of the central opening 44 substantially equidistantly along the opposite end edges of the plate 36 at a spacing corresponding to the bores 28 in the valve body mounting pads 26 to facilitate affixation of the plate 36 thereto by a pair of mounting screws 42. Four spacer posts 57 extend integrally from one face of the bracket plate 36 at the four corners thereof and at equal spacings about the central opening 44 with a respective bore 46 being formed through each spacer post 57 and through the plate 36 to facilitate affixation of the plate 36 by screws 48 to the underside of the actuator body 16 with the opening 44 in coaxial relation to the actuator pinion. Importantly, the central opening 44 and the bores 40, 46 are respectively located in the bracket plate 36 to position the actuator pinion and the valve stem 24 in precise coaxial relation to one another.

To install the coupling apparatus 10, the bracket plate 36, the adapter nut 32 and its retaining screw 34 are initially mounted to the ball valve 14 as above-described. Similarly, the drive socket 30 is initially mounted to the actuator 12. With both the actuator 12 and the ball valve 14 manually actuated to their respective full open positions, the actuator 12 and the ball valve 14 are mounted to one another to position the valve stem adapter nut 32 within the drive socket 30, while at the same time positioning the bores 46 in alignment with the mating bores in the underside of the actuator body 16. Assembly is completed by inserting the mounting screws 48 through the bores 46 and tightening the screws 48 into the corresponding bores in the actuator body.

As will thus be readily understood, the coupling apparatus 10 provides a positive and direct drive connection of the actuator 12 and the ball valve 14 compactly in close adjacency to one another. Importantly, in contrast to conventional bracket arrangements, the central opening 44 of the bracket plate 36 in the present coupling apparatus assures that all reaction loads generated by actuation forces resulting from the reciprocal actuation of the rotary actuator 12 are applied to the trunnion 20 of the valve body 18 rather than the valve stem 24, whereby essentially only torsional actuation forces are applied to the valve stem 24. Similarly, the bracket plate 36 insures that common lateral loads and vertical down loads resulting from movement occurring in the pipeline to which the ball valve 14 is connected are also applied to and absorbed by the valve body trunnion 20 rather than the valve stem or the various mounting screws of the coupling apparatus 10. As a result, the valve stem 24 is substantially isolated and insulated from such potentially damaging loads, thereby enhancing the reliability of performance of the coupled assembly of the actuator and valve.

Furthermore, the bracket arrangement of the present invention insures that visual as well as operational access to the drive portion 22' of the gland screw 22 is available even with the actuator 12 and the ball valve 14 coupled together by the bracket arrangement. Specifically, since the central opening 44 in the bracket plate 36 receives the profiled end of the trunnion 20, the bracket plate 36 is substantially coplanar with the shoulder 20' of the trunnion 20 when the bracket plate 36 is mounted on the valve body 18, whereby the bracket plate 36 is slightly spaced axially from the drive portion 22' axially adjacent the underside thereof. At the same time, the spacer posts 57 project sufficiently upwardly from the bracket plate 36 in its mounted disposition on the valve body 18 to support and maintain the underside of the actuator body 16 at a corresponding axial spacing adjacent the opposite axial side of the drive portion 22'. Sufficient space therefore is left axially between the bracket plate 36 and the actuator body 16 and laterally between the spacer posts 57 to easily view the peripheral drive surface of the drive portion 22' and also to insert a screw driver or similar tool into engagement with one of the notches 25 in the drive surface to manually turn the gland screw 22 as necessary to tighten it with respect to the valve body 18. The bracket arrangement provides sufficiently rigid connection between the actuator body 16 and the valve body 18 that, as necessary, any of the spacer posts 57 may be utilized as a fulcrum point to generate additional leverage when manually driving the gland screw 22 with a screw driver or similar tool as described.

While the present coupling apparatus has been illustrated and described herein in conjunction with specific examples of a conventional rotary actuator and a conventional valve, those persons skilled in the art will readily recognize that the applicability of the present coupling apparatus is not so limited but instead extends to a wide variety of varying actuator and valve constructions. By way of example, the present coupling apparatus may be readily adapted for use with substantially any one-quarter turn fluid or electrically-operated rotary actuator and substantially any conventional type of ball valve, as well as other types of rotary valves, providing some means by which the bracket arrangement may be affixed to the valve body and an alignment bushing may be fixed with respect to the valve body in coaxial relation to the rotary actuating member of the valve.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. Apparatus for coupling a valve of the type having a valve body with gland means rotatably supporting a valve stem for actuating opening and closing movement of said valve, said gland means including a drive portion disposed exteriorly of said valve body for actuating tightening movement of said gland means with respect to said valve body, and a rotary actuator of the type having an actuator body rotatably supporting an output shaft, said coupling apparatus comprising drive means for establishing coaxial drive connection of said valve stem and said output shaft for controlling opening and closing movement of said valve and bracket means for substantially rigidly connecting said valve body and said actuator body, said bracket means including first means for affixation to said valve body axially adjacent one side of said drive portion of said gland means, said first affixation means defining an opening of a shape closely conforming to said valve body annularly with respect to said gland means for receiving said valve body to apply to said valve body reactive loads generated by valve actuation forces of said rotary actuator, whereby essentially only torsional actuation forces are applied to said valve stem, and said bracket means further including second means for affixation to said actuator body for supporting said actuator body axially adjacent the opposite side of said drive portion of said gland means, said first and second affixation mean exposing said drive portion of said gland means for access thereto for periodic tightening without disassembly of said bracket means.

2. Coupling apparatus according to claim 1 and characterized further in that said drive portion of gland means comprises an annular drive surface having notches formed therein for driving engagement therewith.

3. Coupling apparatus according to claim 1 and characterized further in that said valve body comprises a shoulder extending annularly about said drive portion of said gland means axially adjacent said one side thereof for receipt within said opening of said bracket means.

4. Coupling apparatus according to claim 1 and characterized further in that said bracket means comprises plate means bolted to each of said valve body and said actuator body, said opening being formed through said plate means and said second affixation means of said bracket means comprising spacer members on said plate means for disposing said actuator body axially adjacent said opposite side of said drive portion of said gland means.

5. Apparatus for coupling a ball valve of the type having a valve body which rotatably supports a valve ball for reciprocal opening and closing rotation and gland means which rotatably supports a valve stem in operative connection to said valve ball for actuating movement thereof, said gland means including a drive portion having an annular drive surface disposed exteriorly of said valve body for actuating tightening movement of said gland means with respect to said valve body, and a rotary actuator of the type having an actuator body rotatably supporting an output shaft for reciprocal driving rotation, said coupling apparatus comprising drive means for establishing positive coaxial drive connection of said valve stem and said output shaft for controlling opening and closing movement of said valve ball, said drive means including nut means affixed coaxially about said valve stem and mating drive socket means affixed to said output shaft for coaxially receiving said nut means in annular driving engagement therewith, and bracket means for substantially rigidly connecting said valve body and said actuator body, said bracket means including plate means having a flat main body bolted to said valve body axially adjacent one side of said drive surface of said gland means and defining an axial opening receiving and closely conforming to said valve body annularly with respect to said gland means for applying to said valve body reactive loads generated by valve actuation forces of said rotary actuator, whereby essentially only torsional actuation forces are applied to said valve stem, and said plate means further including a plurality of spacer members projecting from said flat main body and bolted to said actuator body for supporting said actuator body axially adjacent the opposite side of said drive surface of said gland means, said plate means exposing said drive surface of said gland means for access thereto for periodic tightening without disassembly of said bracket means.

* * * * *

UNITED STATES PATENT AND TRADEMARK OFFICE
CERTIFICATE OF CORRECTION

PATENT NO. : 4,887,634
DATED : December 19, 1989
INVENTOR(S) : Henry R. Killian

It is certified that error appears in the above-identified patent and that said Letters Patent is hereby corrected as shown below:

Column 3, Line 10, reads "a" but should read -- as --.

Column 6, Line 47, reads "mean" but should read -- means --.

Signed and Sealed this

First Day of September, 1992

Attest:

DOUGLAS B. COMER

*Attesting Officer*      Acting Commissioner of Patents and Trademarks